G. SPRAGUE.
Wheel Cultivator.
No. 64,376.  Patented Apr. 30, 1867.
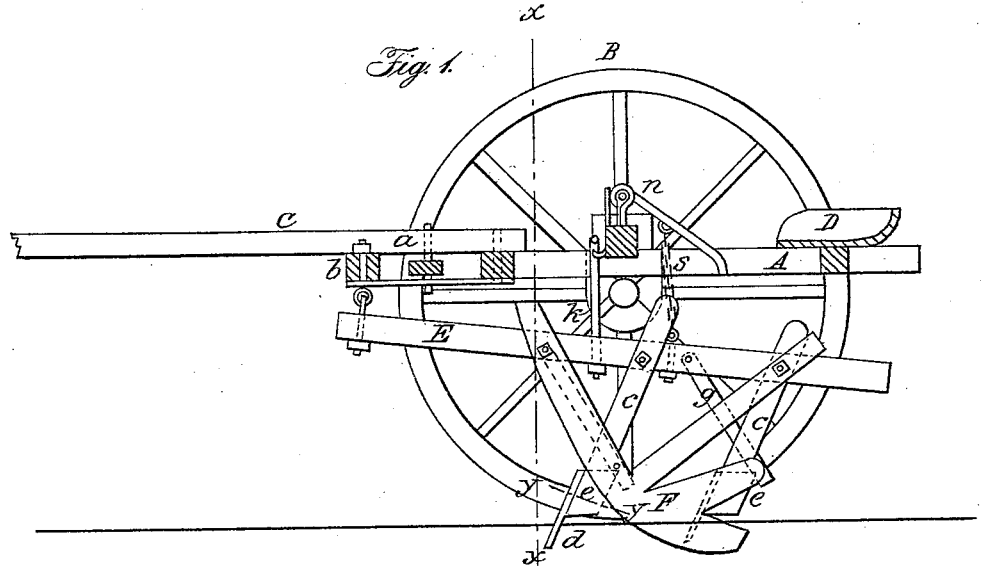
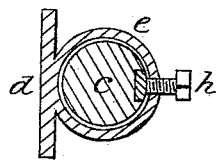
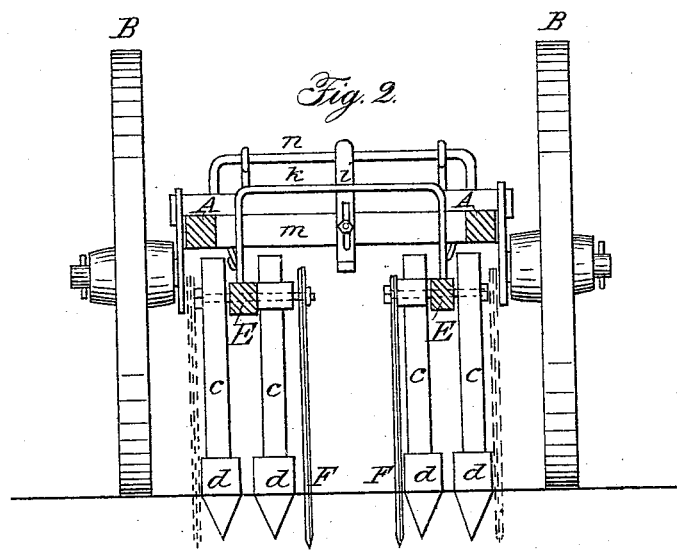
Witnesses:
Theo Tusche
Wm Trewin
Inventor:
Geo Sprague
Per Munn &
Attys

United States Patent Office.

GEORGE SPRAGUE, OF SPRING HILL, KANSAS.

Letters Patent No. 64,376, dated April 30, 1867.

---

IMPROVEMENT IN CORN CULTIVATORS.

---

The Schedule referred to in these Letters Patent and making part of the same.

---

TO ALL WHOM IT MAY CONCERN:

Be it known that I, GEORGE SPRAGUE, of Spring Hill, in the county of Johnson, and State of Kansas, have invented a new and useful Improvement in Corn Cultivators; and I do hereby declare that the following is a full, clear, and exact description thereof, which will enable those skilled in the art to make and use the same, reference being had to the accompanying drawings, forming part of this specification, in which—

Figure 1 is a central vertical longitudinal section of my improved corn cultivator.

Figure 2 is a vertical transverse section, taken in the line $x\ x$, fig. 1.

Figure 3 is a cross-section of a cultivator shovel, in the line $y\ y$, fig. 1, showing the plan for shifting its position to the work.

Similar letters of reference indicate corresponding parts.

This invention relates to a new and improved construction and arrangement of a cultivator for working corn between the rows on both sides of the hill at once, and consists in the arrangement of the shovels so that they can be adjusted to throw the dirt either way, to or from the corn, and also in attaching cutters to work in advance of the shovels, so as to cut the roots and prevent the shovels from dragging up the hills of corn.

A represents an ordinary square-formed frame, mounted on two wheels B B, and having a tongue, C, for two horses. In the rear is a driver's seat, D. Two long plough-beams, E E, are suspended by bolts $a\ a$ to the front cross-bar $b$, through which the bolts pass in slots that allow them to be adjusted for setting the forward ends of the plough-beams nearer or further apart, as may be desired, in working the cultivator. On opposite sides of each of the beams E E are bolted standards $c\ c$, one in advance of the other, with shovels $d\ d$ attached and set apart in such manner that the inside shovel on each plough-beam shall work next the row or hills of corn, while the outside shovel on each beam shall work near the middle between the rows, as shown in fig. 2. The standards $c\ c$ are held in place at any desired angle of inclination by guide-bars $g\ g$, which are fastened to the plough-beams, and pass through slots in the standards, allowing the lower ends to set higher or lower. Each shovel, $d$, is made with a round hollow neck or socket-shank, $e$, that fits on the end of the stock or standard $c$, to which it is secured in any desired position by a set-screw, $h$, for the purpose of throwing the dirt either towards or from the corn, as shown clearly in detail, fig. 3. On the inside of the shovels, next the row, are placed sharp flat iron or steel cutters, F F, the upper ends of which are secured to the plough-beams E E, and the lower ends curve backwards just in advance of the inside shovels, for cutting roots and preventing the shovels from dragging the corn plants out of the hills. The same device may be attached outside of the outer shovels, as shown in red, fig. 2. The plough-beams E E are provided with a yoke, $k$, to connect them and regulate the depth of the shovels, by raising and lowering the yoke, and securing it to a gauge-bar, $i$, in the middle of the cross-bar $m$, between the wheels; and it is raised or lowered by the driver on the seat by means of a swing-frame, $n$, to which the plough-beams are suspended with chains $s\ s$.

The operation and advantages of these arrangements and devices for the cultivation of corn are manifest.

Having thus described my invention, what I claim as new, and desire to secure by Letters Patent, is—

The combination of the root-cutters F F, the shovels $d\ d$, and the plough-beams E E, arranged and connected for adjustment and operation substantially as and for the purposes herein described.

GEORGE SPRAGUE.

Witnesses:
EASOM FITZGERALD,
STEPHEN GRISTY.